(12) United States Patent
Hayman et al.

(10) Patent No.: US 7,385,873 B2
(45) Date of Patent: Jun. 10, 2008

(54) MASS POSITIONING ADJUSTMENT MECHANISM FOR A SEISMIC SENSOR

(75) Inventors: Mark Jonathan Brice Hayman, Dunrobin (CA); Bruce Leigh Townsend, Stittsville (CA); Nicholas Jason Ackerley, Ottawa (CA)

(73) Assignee: Nanometrics Inc. (CA)

( * ) Notice: Subject to any disclaimer, the term of this patent is extended or adjusted under 35 U.S.C. 154(b) by 375 days.

(21) Appl. No.: 11/337,804

(22) Filed: Jan. 23, 2006

(65) Prior Publication Data

US 2006/0203616 A1 Sep. 14, 2006

(30) Foreign Application Priority Data

Jan. 24, 2005 (CA) .................... 2493852

(51) Int. Cl.
*G01V 1/00* (2006.01)
*G01D 3/028* (2006.01)
(52) U.S. Cl. ..................................... 367/13
(58) Field of Classification Search ............. 367/13, 367/178; 73/1.85
See application file for complete search history.

(56) References Cited

U.S. PATENT DOCUMENTS

| | | |
|---|---|---|
| 2,909,759 A | 10/1959 | Cook |
| 4,280,206 A | 7/1981 | Guralp |
| 5,983,699 A | 11/1999 | Guralp et al. |

FOREIGN PATENT DOCUMENTS

| | | | |
|---|---|---|---|
| CA | 2493826 | * | 7/2006 |
| CA | 2493852 | * | 7/2006 |

OTHER PUBLICATIONS

U.K. Patent Search Report dated May 9, 2006 from Great Britain Patent Application GB0601349.4.
MJ Usher, IW Buckner and RF Burch, *A miniature wideband horizontal-component feedback seismometer*, Journal of Physics E: Scientific Instruments, 1977, 8 pages, vol. 10, Great Britain.
L. Gary Holcomb, Charles R. Hunt, *An Evaluation of Installation Methods For STS-1 Seismometers*, United States Department of the Interior Geological Survey, Open File Report 92-302, 1992, 37 pages, Albuquerque, New Mexico.
Winifred Hanka, *Which Parameters influence the Very Long Period Performance of a Seismological Station?*, downloaded from http://www.gfz-potsdam.de/geofon/manual/welcome.html, on Feb. 19, 2004, GEOFON Network, 13 pages, Potsdam, Germany.

(Continued)

*Primary Examiner*—Dan Pihulic
(74) *Attorney, Agent, or Firm*—Straub & Pokotylo; Michael P. Straub; Ronald P. Straub

(57) ABSTRACT

A mass position adjustment apparatus for use in a seismic sensor having axis mechanics including a pivotable boom with a defined null point is described. The apparatus comprising: (a) adjustment means for positioning the boom at the null point; (b) actuator means for moving the adjustment assembly; and (c) interface means having hard mineral members for interfacing the actuator means with the adjustment means for reducing occurrences of micro-mechanical movement when the mass position adjustment apparatus is not being operated.

18 Claims, 8 Drawing Sheets

OTHER PUBLICATIONS

RV Jones, JCS Richards, *The design and some applications of sensitive capacitance micrometers*, Journal of Physics E: Scientific Instruments, 1973, pp. 589-600, vol. 6, Great Britain.

Erhard Wielandt, *Seismic Sensors and their Calibration*, downloaded from http://www.geophys.uni-stuttgart.de/seismometry/man_html/man_html.html, 28 pages, on Mar. 15, 2000, Stuttgart, Germany.

E. Wielandt, G. Streckeisen, *The leaf-spring seismometer: design and performance*, Bulletin of the Seismological Society of America, Dec. 1982, vol. 72, No. 6, pp. 2349-2367, , Eidgenossische Technische Hochshule, Institute fur Geophysik, Zurich, Switzerland.

\* cited by examiner

MASS POSITIONING ADJUSTMENT MECHANISM FOR A SEISMIC SENSOR

CROSS-REFERENCE TO RELATED APPLICATIONS

This application claims priority to Canadian application no. 2,493,852 filed on Jan. 24, 2005, and is related to U.S. patent application Ser. No. 11/337,834, filed on Jan. 23, 2006, titled "SEISMIC SENSOR WITH THERMAL STABILIZATION" identified by (US), and U.S. patent application Ser. No. 11/337,967, filed on Jan. 23, 2006, titled "MASS POSITIONING APPARATUS FOR A SEISMIC SENSOR" identified by (US), all of which are hereby expressly incorporated by reference.

FIELD OF THE INVENTION

The present invention relates to the field of seismic sensors and more particularly to mass positioning adjustment mechanisms for use with seismic sensors.

BACKGROUND

Seismometers frequently experience spontaneous internal transient disturbances. This tends to occur most frequently with new instruments and to lesser degree when an instrument is first installed, moved or otherwise disturbed. These disturbances can appear as spikes in a time domain signal data. Spikes having amplitudes sufficiently larger than the concurrent seismic signal can be distinguished from natural events by their shape. However, even extremely low amplitude disturbances too small to be distinguished from low level seismic background activity in the time domain, can become apparent in the frequency domain, obscuring the power spectral density of the real seismic signal in the frequency range where it is quietest.

The disturbances occur when mechanical stresses in the components of the seismometer are spontaneously relieved; causing a mechanical shock that is interpreted as seismic signal. The frequency of occurrence of disturbances (often called pings and pops) may decline over time (months to years) as stresses inherent in the assembly are permanently relieved. Stresses induced by environmental changes or moving parts can build and be spontaneously relieved repetitively through the operational life of the seismometer. Conventional approaches to minimize pings or pops include minimizing static mechanical stresses, aging of components, temperature cycling of components and assemblies to relieve internal stresses, and careful assembly to both minimize stresses and the likelihood that stresses would be relieved.

A broadband seismometer typically uses an adjustable mass positioning mechanism operated by an electrical motor or a manually adjusted screw to position an inertial mass to a measurement null point to compensate for the inertial mass moving from the null point due to environmental changes or mis-calibration. This mechanism has moving parts that can be a source of pings and pops.

There is a need to provide mass positioning mechanisms that are less susceptible to spontaneous micro-mechanical movement that can be realized relatively economically inside the seismic sensor without significantly increasing the volume of the sensor enclosure.

SUMMARY

In accordance with one aspect of the present invention there is provided a mass position adjustment apparatus for use in a seismic sensor having axis mechanics including a pivotable boom with a defined null point, the apparatus comprising: adjustment means for positioning the boom at the null point; actuator means for moving the adjustment assembly; and interface means having hard mineral members for interfacing the actuator means with the adjustment means for reducing occurrences of micro-mechanical movement when the mass position adjustment apparatus is not being operated.

In accordance with another aspect of the present invention there is provided a mass position adjustment apparatus for use in a seismic sensor having axis mechanics including a pivotable boom with a defined null point, the apparatus comprising: a flexure joint having a first leaf hinge; and adjustment means for positioning the boom at the null point, the adjustment means having a tensioner arm pivotably mountable to the axis mechanics by the flexure joint, the first leaf hinge being oriented in a plane at a significant angle with respect to the tensioner arm.

In accordance with another aspect of the present invention there is provided a mass position adjustment apparatus for use in a seismic sensor having axis mechanics including a pivotable boom with a defined null point, the apparatus comprising: boom spring tension adjustment means for positioning the boom at the null point; and actuator means for moving the adjustment assembly; wherein the actuator means includes a motor, an actuator screw, and coupling means for coupling the motor assembly to the actuator screw to rotate the actuator screw, such that the coupling means disengages upon the motor reversing and reengages upon the motor rotating a fixed amount.

DETAILED DESCRIPTION

Figure 1:
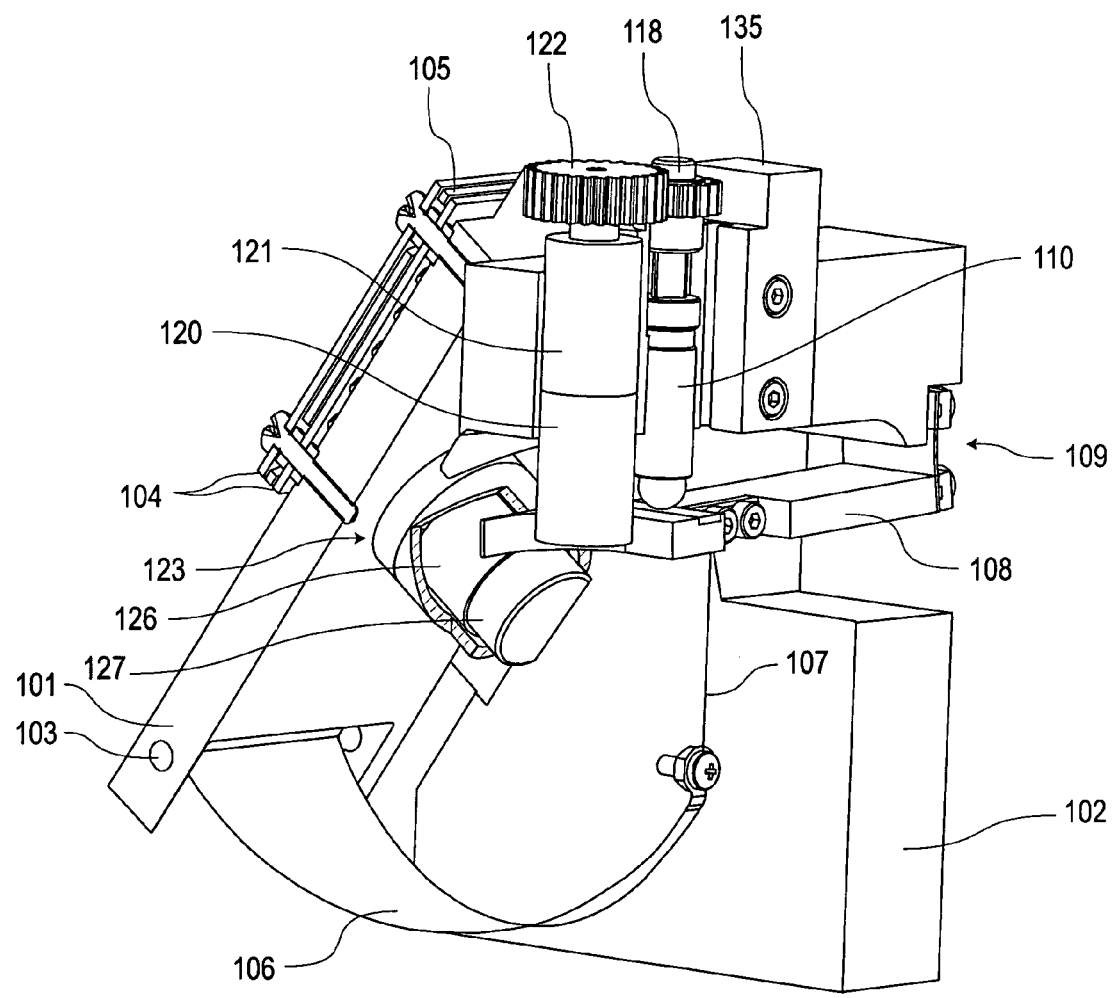
FIG. 1 illustrates a schematic perspective cut-away view of axis mechanics of a seismic sensor incorporating a mass positioning adjustment mechanism according to an embodiment of the present invention.

FIG. 1 illustrates axis mechanics including a mass positioning mechanism/apparatus according to an embodiment of the present invention for use in a seismic sensor. An inertial mass called a boom 101 is attached to a frame 102 by a suspension 103 that permits the boom 101 to pivot as a pendulum without appreciable mechanical friction about the axis of the suspension 103. A capacitive displacement transducer includes two metal plates 104 attached to the boom 101 and a center plate 105 fixed to the frame 102 positioned between the two plates 104. The displacement transducer provides a mechanism for an electronic component (not shown and can be located either internally or externally to the sensor) to detect the position of the boom 101 relative to a null point, defined as the position where the center plate 105 is equidistant from the outer plates 104. A metal boom spring 106 supports the boom 101 to counterbalance the force of gravity and provide a restoring force that returns the boom 101 to the null point is attached at one end to the boom 101 and is suspended at the other end by a wire 107.

A force actuator 123 includes a forcer coil 126 and magnet 127 attached respectively to the boom 101 and the frame 102 is energized by an electronic component (located within or external to the seismic sensor) that measures the displacement of the boom 101 and applies a counteracting force to keep the boom 101 centered when external acceleration would tend to displace the boom 101.

A mass positioning adjustment mechanism, according to an embodiment of the present invention, includes an adjustment means, an actuator means, and a means for interfacing the actuator means with the adjustment means. The adjustment means comprises of a tensioner arm 108, and a flexure joint 109. The actuator means comprises of an actuator 132, a gear driver 118, a gear 122, a reduction gearbox 121 and a stepper motor 120. The interface means comprises of sapphire sphere 117 and a sapphire plate 116. The stepper motor 120 is used to adjust the position of the inertial mass of the boom 101 and to precisely center the boom 101 at a null point. This is to counteract the effects of changes in tilt and temperature, as well as to permit the seismometer to be adjusted if for any reason the null position had changed due to shock or other circumstance.

Changing the tilt of the sensor (as happens during installation or when adjusting the position of the instrument) changes the direction gravity acts on the boom 101, which causes the boom 101 to move away from the null point. Changes in ambient temperature alters the spring constant of the spring 106 according to the Thermal Elasticity Coefficient (TEC) of the material of the spring 106, and the internal geometry of the axis mechanics can change according to the coefficients of thermal expansion of the various component materials, which together alter the force counterbalancing the boom 101 causing it to move away from the null point. The signal from the displacement transducer is electronically integrated and fed back to the force actuator 123, which compensates for temperature change within a certain operational range, beyond which mechanical adjustment of the mass position is required.

The mass positioning mechanism acts by adjusting the tension of the spring 106 to adjust the position of the boom 101. The center of mass of the boom 101 is lifted consequent on the tensioner arm 108 rising which pulls the wire 107 thus tensioning the boom spring 106, and correspondingly the center of mass of the boom is lowered when the tensioner arm 108 moves down.

By way of background, spontaneous transient disturbances in various mechanical components of a seismic sensor cause spurious transients in the output signal by causing the boom 101 to move relative to the axis frame 102. The position of the boom 101 from its null point and correspondingly the amount of force the force actuator 123 applies to keep the boom 101 close to the null point is a measure of acceleration. An internal mechanical disturbance that results in the sudden displacement of the boom 101 from its null point is manifest as a step change in acceleration, which then slowly decays to zero as the electronic integrator gradually removes the effect of constant acceleration.

Figure 6:
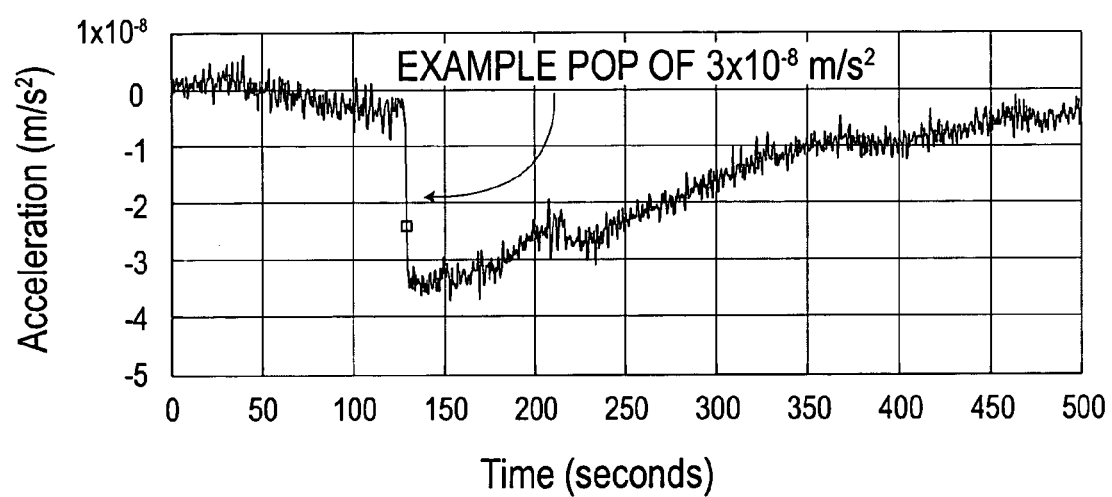
FIG. 6 illustrates a graph of an example spurious pop as manifest in the time domain signal from a seismic sensor converted from a velocity signal to an acceleration signal.
Figure 7:
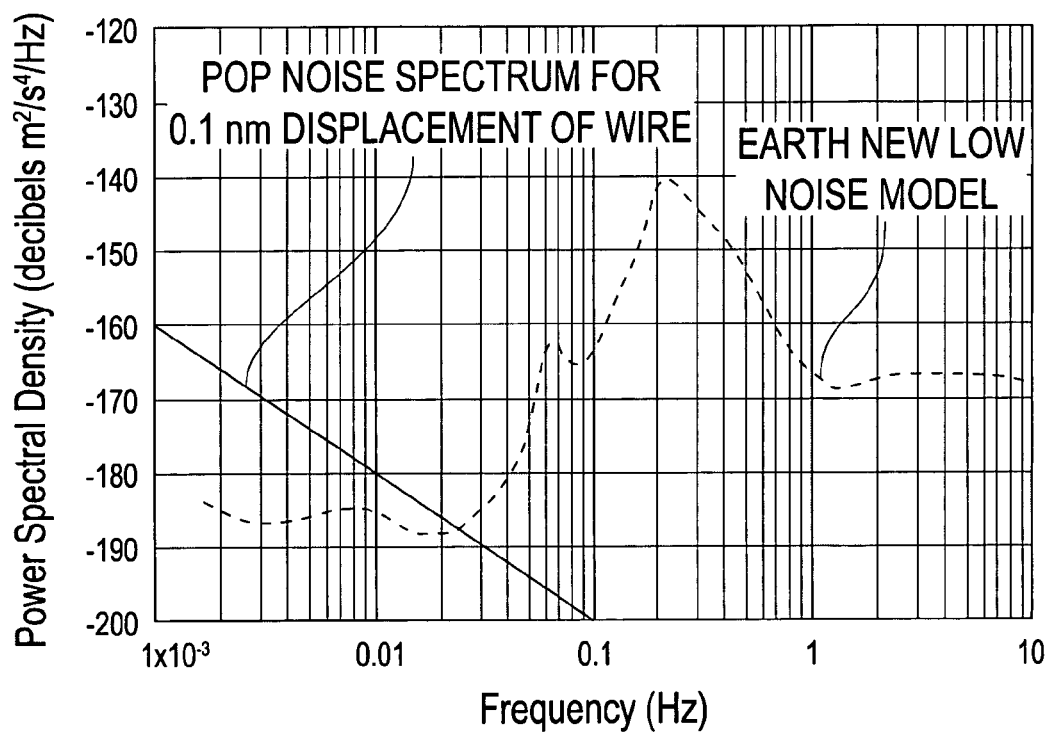
FIG. 7 illustrates a graph of an example of a power spectral density of an idealized pop that would result from a 0.1 nm displacement of a spring tensioning wire, shown together with the Earth New Low Noise Model.

FIG. 6 illustrates an example pop in the time domain, the manifestation of an internal disturbance which resulted in a spurious step change of acceleration of approximate amplitude $3 \times 10^{-8}$ m/s$^2$. Seismic signals are considered in the frequency domain by plotting the power spectral density of acceleration on a logarithm scale (units: decibels of m$^2$/s$^4$/Hz). An empirical model of the minimum seismic noise experienced globally on the Earth's surface is called the New Low Noise Model (NLNM), and a common objective is to be able to reduce spurious noise energy in frequency bands of interest to less than the NLNM (see FIG. 7). An idealized pop (step change of acceleration) has a power spectral density that has a −20 dB/decade slope. Because the slope rises as frequency decreases, very small pops resulting from sub-nanometer displacements are enough to cause a spurious noise spectrum that exceeds the Earth low noise model at 0.01 Hz and below. For example, theoretical analysis shows that a single sudden displacement of just 0.1 nm in an 8 hour interval of the mass tensioning wire that suspends the boom spring 106 results in a spurious noise spectrum that exceeds the New Low Noise Model of −185 dB at 0.01 Hz by 5 dB and by more at lower frequencies as illustrated in FIG. 7. Increased incidence of pops, or pops of higher amplitude has correspondingly greater impact.

Various embodiments of the mass positioning adjustment mechanism according to the present invention use appropriate kinematic design principles to ensure that motion between components are constrained by point contacts rather than surface contacts and that there be an appropriate number of contact points required to constrain motion. In general, too many contact points means the system is over-constrained (such as for the example of a four-legged chair) and the part may "rock" or spontaneously transition from one set of contact points to a different set, which would cause pops. Equally, too few contact points means the system is under-constrained, and the part may spontaneously rotate around or slide on the contact points thus moving to a new position.

Figure 2:
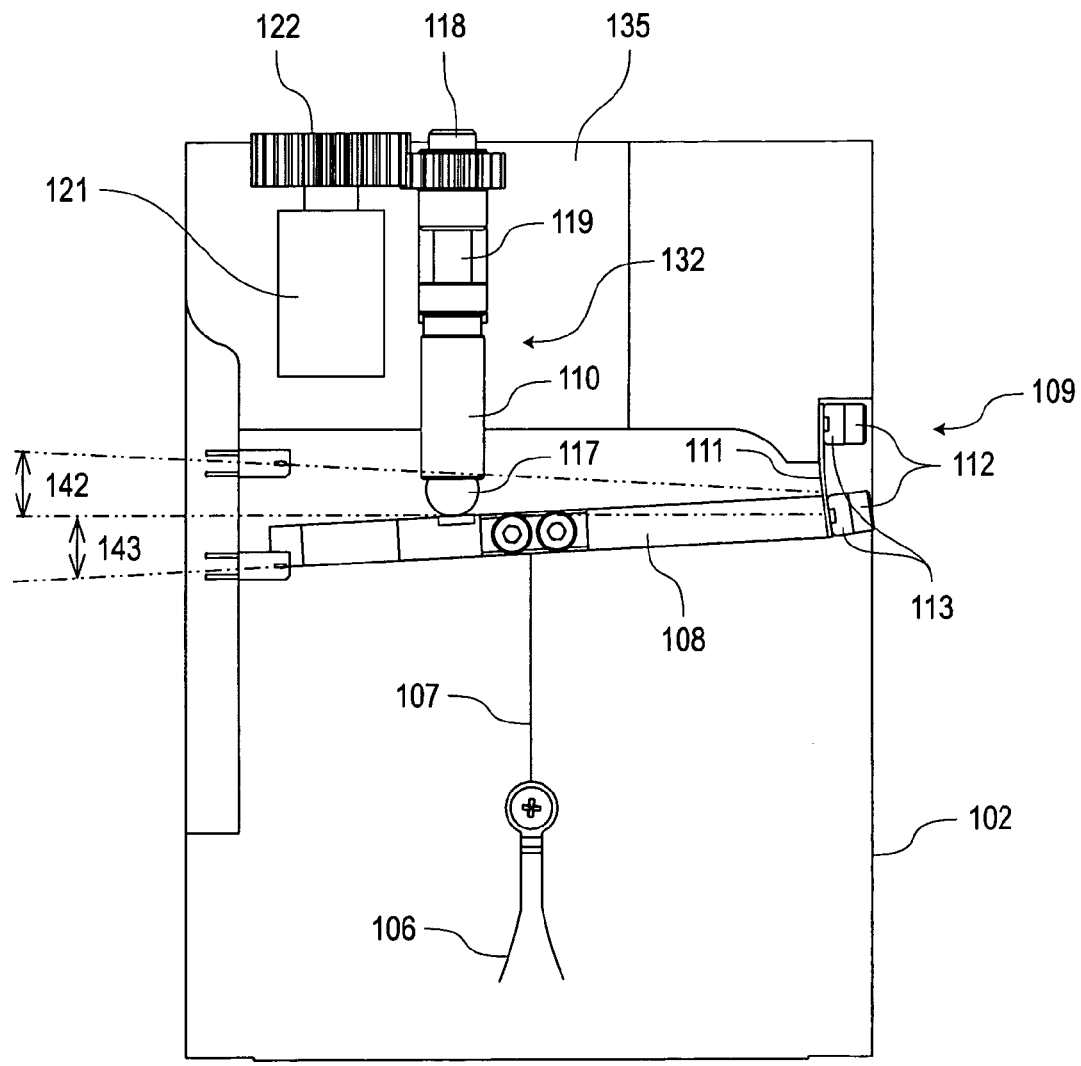
FIG. 2 illustrates a schematic sectioned rear view of the axis mechanics of a seismic sensor showing the mass positioning mechanism of FIG. 1.

FIG. 2 illustrates further details of the mass positioning adjustment mechanism according to an embodiment of the present invention. One end of the wire 107 is attached to the midpoint of a tensioner arm 108. The tensioner arm 108 is hinged to the frame 102 by means of a compliant mechanism called a flexure joint 109 that reduces the appreciable static and sliding friction otherwise inherent in a hinge comprising of moving components that slide or rub at contact points or surfaces. The use of a flexure joint to hinge the tensioner arm 108 further minimizes build up of stresses in the mass positioning mechanism that could be spontaneously relieved at some later time and cause pops. In an embodiment of the present invention, the flexure joint 109 further includes a leaf hinge 111, screws 112 and backing plates 113. The leaf hinge 111 is made of a plate of stiff elastic material such as copper beryllium that elastically deforms to permit the tensioner arm 108 to pivot in an arc contained within a vertical plane. The leaf hinge 111 is oriented in a plane at a significant angle (such as substantially perpendicular) with respect to the tensioner arm 108. Alternative means of implementing a flexure joint include providing a notch hinge in which material is removed from a member in a local region to leave a thin region forming a compliant bending point.

The actuator 132 further comprises of a brass threaded actuator screw 110 with a flat tab 119 at one end and a sapphire sphere 117 glued into a concave cup at the opposite end is threaded into an actuator mounting block 135 which in turn is attached to the frame 102. The actuator 132 moves up or down when rotated and makes contact with the tensioner arm 108 to position the boom 101 by changing the angle of the tensioner arm 108. Mounting the actuator 132 in an actuator mounting block 135 separate from the frame 102 permits the use of different materials for the frame 102 and actuator mounting block 135, each selected for the specific and distinct purpose of the component. The actuator mounting block 135 is made of the same material as the actuator screw 110 thus preventing disturbances due to thermal expansion causing movement between moving parts of dissimilar materials, and is a material such as brass suitable for precision machined screw threads. The frame 102 is made of a dimensionally stable material such as aluminum that is lightweight and stiff to reliably support the boom 101 and other components.

A useful range of travel of the tensioner arm 108 is from an angle denoted the upper extent 142 approximately from 3 degrees above the horizontal plane to an angle denoted the lower extent 143 approximately 3 degrees below the horizontal plane, which corresponds to a maximum travel of the wire of approximately 4 mm. The leaf hinge 111 is attached to the frame 102 and tensioner arm 108 with screws 112 and backing plates 113 at such angles such that when not otherwise constrained the restoring force of the leaf hinge 111 positions the tensioner arm 108 at an angle above the horizontal plane exceeding the upper extent. The leaf hinge 111 is of sufficient stiffness that the weight of the boom 101 as transmitted to the wire 107 does not draw the tensioner arm 108 below the upper extent, but it is not so stiff that the yield strength of the leaf hinge material is exceeded when the tensioner arm 108 is forced down to the lower extent. In this arrangement the leaf hinge 111 acts as both hinge and spring, providing a sufficient restoring force such that the tensioner arm 108 makes positive contact with the actuator 132 through its useful range of travel.

If unconstrained by the actuator 132, the tensioner arm 108 is free to pivot in the desired arc subject to the relatively weak restoring force of the leaf hinge 111, which is the first and desired degree of freedom of motion. The tensioner arm 108 is to a lesser degree able to pivot from side-to-side subject to the greater restoring force of the leaf hinge 111 as it twists, which second degree of freedom is undesirable. Were the leaf hinge 111 perfectly flat and not elastically deformed into a curve, it would fully constrain the tensioner arm 108 from twisting about its axis. The radius of the leaf hinge 111 under stress theoretically permits some twist to occur but the restoring force is high enough that for practical purposes it can regarded as sufficiently constrained and does not count as a third degree of freedom. Kinematic principles require one point of contact for every degree of freedom to be controlled. The first degree of freedom is controlled by a single point of contact provided between the actuator 132 and the tensioner arm 108. The second degree of freedom is constrained either by the sufficient restoring twist force of the leaf hinge 111 when a single contact tensioner arm 108 design is employed or by a second contact point provided by a dual-contact tensioner arm 130 design as illustrated in FIG. 4.

Figure 8:
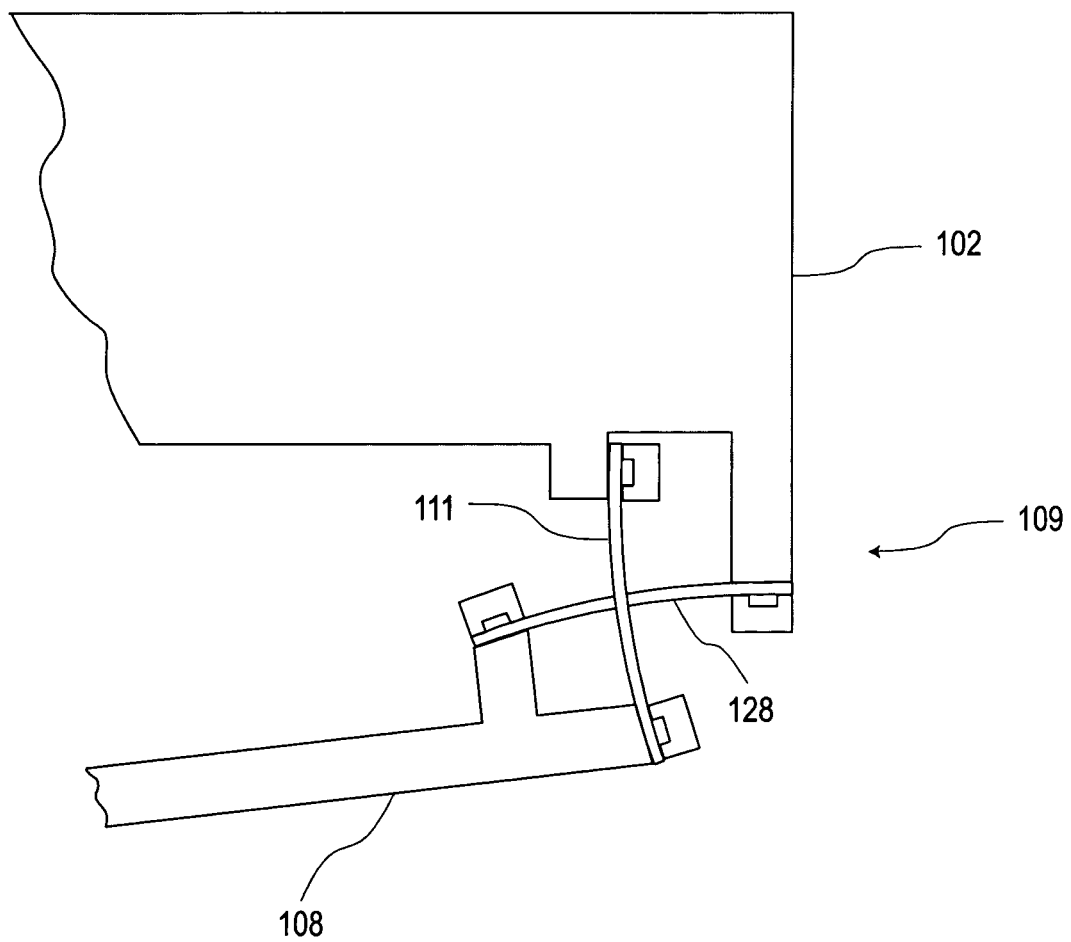
FIG. 8 illustrates a schematic sectioned rear view of the axis mechanics of a seismic sensor showing an alternative flexure joint having a dual leaf hinge.

The second degree of freedom can be alternatively eliminated by employing a second leaf hinge 128 as illustrated in FIG. 8 to attach the tensioner arm 108 to the frame 102 that is oriented substantially perpendicularly (i.e., at a significant angle) to the leaf hinge 111 and laterally to the tensioner arm 108. This constrains the tensioner arm 108 from moving side-to-side leaving only one degree of freedom.

Figure 3:
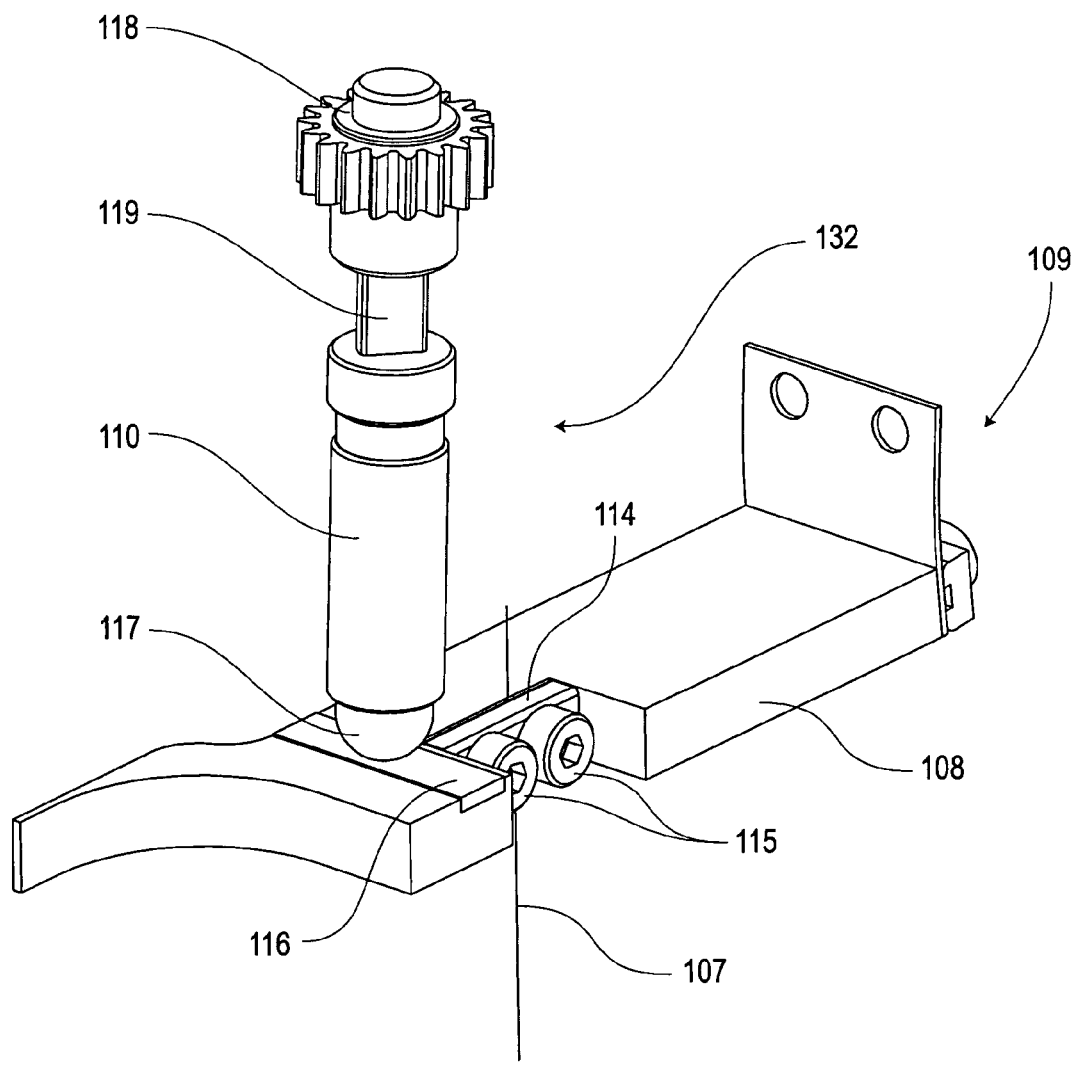
FIG. 3 illustrates a schematic perspective view of a tensioner arm of the mass positioning mechanism shown in FIG. 2 according to an embodiment of the present invention.

FIG. 3 illustrates an example tensioner arm 108 according to an embodiment of the present invention in which a single contact point is made between the actuator 132 and the tensioner arm 108. The suspension wire 107 is attached to the tensioner arm 108 at a point on its long central axis by clamping it with a backing plate 114 fastened by screws 115, which mitigates the effect on the wire 107 of any twisting of the tensioner arm 108 along its long axis. A sapphire plate 116 is located and glued in a recess machined into the tensioner arm such that the sapphire ball 117 of the actuator 132 makes contact on or near its center. As the actuator 132 turns and consequently raises or lowers, the point at which contact is made changes and a sliding action between the sapphire ball 117 and sapphire plate 116 occurs.

Figure 4:
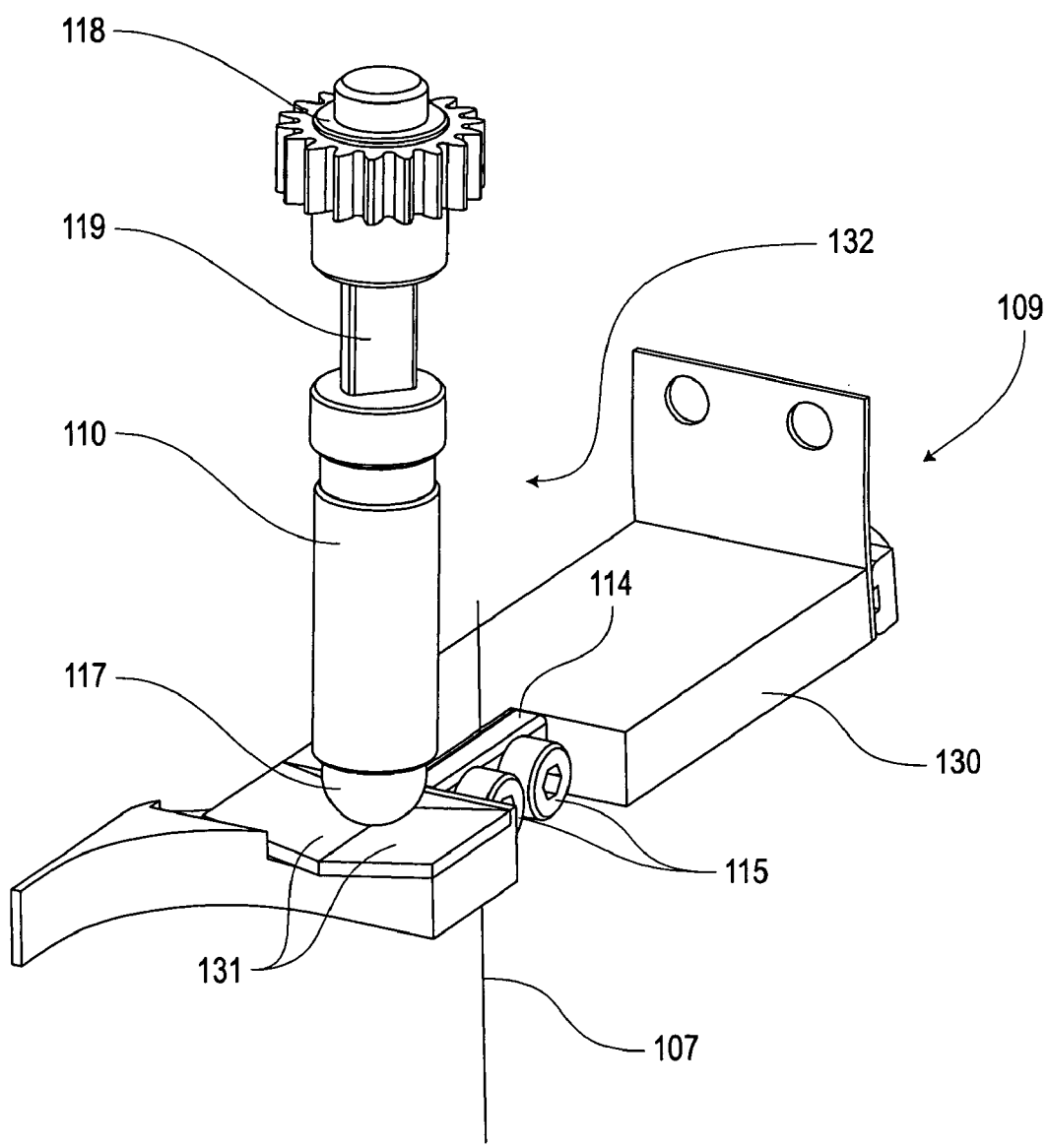
FIG. 4 illustrates a schematic perspective view of an alternative embodiment of the tensioner arm of the mass positioning mechanism according to an embodiment of the present invention.

FIG. 4 illustrates an alternative tensioner arm 130 design in which exactly two contact points are made between the actuator 132 and the tensioner arm 130. Two sapphire plates 131 are located and glued in an angled recess machined into the tensioner arm to form a V-groove such that the sapphire ball 117 of the actuator 132 makes contact at exactly two points on its surface. As the actuator 132 turns and consequently raises or lowers, the points at which contact is made change and a sliding action between the sapphire ball 117 and sapphire plates 131 occurs.

The sapphire-to-sapphire contact points that are the sliding surfaces of the mass tensioning mechanism present a sufficiently smooth non-wearing non-conforming low-friction interface that forms a single local contact point in accordance with appropriate kinematic design principles. Material with roughness Ra significantly less than 10 nm, hardness greater than 8 on the Mohs scale and modulus of elasticity greater than $30 \times 10^6$ PSI is an example for the sliding contact interface. Examples of suitable material include: sapphire, aluminum oxide, corundum, ruby, diamond, silicon, silicon carbide, boron nitride, boron carbide, and zirconium dioxide. A smooth surface minimizes adhesive wear due to surface asperities (junctions of contact where atom-to-atom contact is made) and minimizes the potential for the contact point to spontaneously transition from a high point on a rough surface to a lower point. The very hard surface of sapphire minimizes wear due to plastic deformation that may cause the surface to become rough through use. The high degree of stiffness of the sapphire material minimizes the tendency of the materials to elastically conform to each other at the contact point and so ensures the contact remains effectively a kinematic point contact. A kinematic point contact with no appreciable elastic deformation and plastic deformation reduces the incidence of spontaneous disturbances.

The actuator 132 may be operated manually using a screwdriver, provided an access port be made available in the pressure sealed enclosure to insert the screwdriver. An internal electric motor can also be employed to operate the mechanism. A stepper motor 120 is mounted in the actuator mounting block 135 together with an integral reduction gearbox 121 and an external gear 122. The stepper motor 120 is controlled by a microprocessor on the electronic component to rotate the external gear 122 in discrete steps. The external gear 122 engages the gear driver 118 which engages the tab 119 to cause the actuator 132 to rotate and thus raise or lower. The arrangement of the external gear 122 in line with the motor 120 and gear driver 118 in line with the actuator 132 permits the motor to be mounted adjacent to the actuator 132 and within the body of the axis frame 102 that minimizes the volume occupied by the motorized mass positioning mechanism and interference with adjacent axes in a triaxial seismic sensor.

Figure 5:
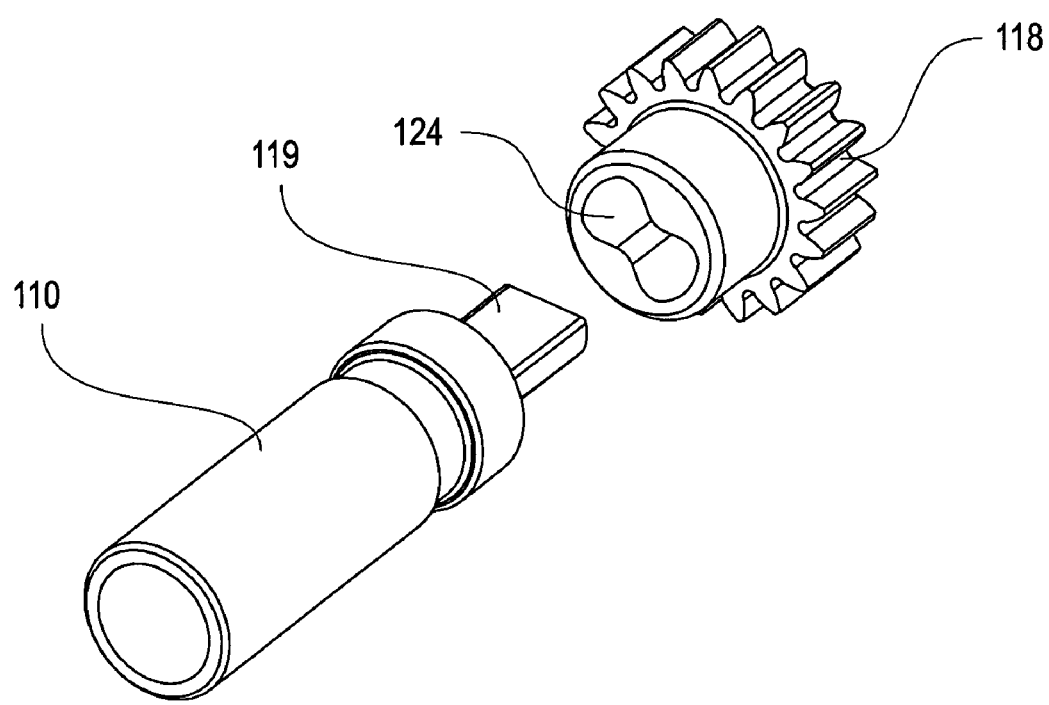
FIG. 5 illustrates a schematic perspective of a gear driver and actuator screw of the mass positioning mechanism according to an embodiment of the present invention.

Referring to FIG. 5, an integral tab 119 at the top end of the actuator screw 110 protrudes into a butterfly slot 124 machined into the bottom of the gear driver 118. The butterfly slot 124 is designed so that the gear driver engages the actuator 132 to rotate it in either direction, and when the gear driver reverses it rotates approximately 60 degrees before engaging the actuator 132 and causing it to turn in the opposite direction. By this means the microprocessor of the electronic component can control the stepper motor 120 to reverse the gear driver by 30 degrees once the mass has been properly positioned at the null point, effectively disengaging the motor 120, reduction gearbox 121, gear 122 and gear driver 118 completely from the actuator 132.

This type of arrangement ensures that spontaneous mechanical disturbances associated with the moving parts particularly susceptible to spontaneous movement including the motor, reduction gearbox, external gear, and gear driver are isolated and not transmitted through the actuator 132 to the tensioner arm, thus preventing these disturbances from causing spurious pops in the seismic output signal. Electric motors retain electromagnetic potential energy in the armature which can apply force causing spontaneous movement. Mechanical stresses are built up within the multi-stage reduction gearbox. The external gear and gear driver have significant inertial mass that can give rise to relative movement (wiggle) of these moving parts when the sensor vibrates due to real ground motion. These effects are prevented from causing displacements of the boom 101 once the gear driver 118 is disengaged from the actuator 132.

Various embodiments of the present invention provide a mass positioning adjustment mechanism for a seismic sensor for reducing the incidence of spontaneous mechanical disturbances (also called pops). Specifically, the mass tensioning adjustment mechanism is mounted using kinematic point contacts and flexure joints, and the motor is disengaged when not being operated. Thus, the mechanism alleviates the tendency to induce spurious disturbances in the output signal, and is less susceptible to wear.

Although the various aspects of the present invention have been described in terms of particular embodiments and applications one of ordinary skill in the art, in light of this teaching, can generate additional embodiments and modifications without departing from the spirit of or exceeding the scope of the claimed invention. Accordingly, it is to be understood that the drawings and descriptions herein are proper by way of example to facilitate comprehension of the invention and should not be construed to limit the scope thereof.

The invention claimed is:

1. A mass position adjustment apparatus for use in a seismic sensor having axis mechanics including a pivotable boom with a defined null point, the apparatus comprising:
   adjustment means for positioning the boom at the null point;
   actuator means for moving the adjustment assembly; and
   interface means having hard mineral members for interfacing the actuator means with the adjustment means for reducing occurrences of micro-mechanical movement when the mass position adjustment apparatus is not being operated.

2. The apparatus of claim 1, wherein the hard mineral members are arranged as a convex mineral surface in tangential contact with a planar mineral surface at a first contact point.

3. The apparatus of claim 2, wherein the hard mineral members include a second contact point, wherein the first and the second contact points are arranged as a convex mineral surface in tangential contact with two planar mineral surfaces that form a V-groove.

4. The apparatus of claim 1, wherein the hard mineral members have a hardness greater than 8 on the Mohs scale, a surface roughness Ra less than 10 nm and a modulus of elasticity exceeding $30 \times 10^6$ PSI.

5. The apparatus of claim 1, wherein the hard mineral members include material selected from the group consisting of: sapphire, aluminum oxide, corundum, ruby, diamond, silicon, silicon carbide, boron nitride, boron carbide, and zirconium dioxide.

6. The apparatus of claim 1, wherein the adjustment means includes:
   a flexure joint having a first leaf hinge; and
   a tensioner arm pivotably mounted to the axis mechanics by the flexure joint, the first leaf hinge being oriented in a plane approximately perpendicular to the tensioner arm.

7. The apparatus of claim 6, wherein the flexure joint further comprises a second leaf hinge hinging the tensioner arm to the axis mechanics, the second leaf hinge being oriented in a different plane than the first leaf hinge.

8. The apparatus of claim 6, wherein the first leaf hinge is arranged to provide sufficient restoring force to enable the tensioner arm to make positive contact with the actuator through a range of travel when the seismic sensor is subjected to acceleration of less than approximately 1 g.

9. The apparatus of claim 1, wherein the actuator means includes a motor, an actuator screw, and coupling means for coupling the motor to the actuator screw to rotate the actuator screw, such that the coupling means disengages upon the motor reversing and reengages upon the motor rotating a fixed amount.

10. The apparatus of claim 9, including means for reversing the motor a fixed amount to disengage the coupling means when the mass position adjustment apparatus is in a non-operation mode.

11. The apparatus of claim 1, wherein the adjustment means includes:
   a flexure joint having a first leaf hinge; and
   a tensioner arm pivotably mounted to the axis mechanics by the flexure joint.

12. The apparatus of claim 11, wherein the flexure joint further comprising a second leaf hinge hinging the tensioner arm to the axis mechanics, the second leaf being oriented in a different plane than the first leaf hinge.

13. The apparatus of claim 11, wherein the first leaf hinge is arranged to provide sufficient restoring force to enable the tensioner arm to make positive contact with the actuator through a range of travel when the seismic sensor is subjected to acceleration of less than 1 g.

14. A mass position adjustment apparatus for use in a seismic sensor having axis mechanics including a pivotable boom with a defined null point, the apparatus comprising:
   a flexure joint having a first leaf hinge; and
   adjustment means for positioning the boom at the null point, the adjustment means having a tensioner arm pivotably mountable to the axis mechanics by the flexure joint, the first leaf hinge being oriented in a plane at a significant angle with respect to the tensioner arm.

15. The apparatus of claim 14, wherein the flexure joint further comprises a second leaf hinge to hinge the tensioner arm to the axis mechanics, the second leaf hinge being oriented in a different plane than the first leaf hinge.

16. The apparatus of claim 15, wherein the first leaf hinge is arranged to provide sufficient restoring force to enable the tensioner arm to make positive contact with the actuator through a range of travel when the seismic sensor is subjected to acceleration of less than approximately 1 g.

17. A mass position adjustment apparatus for use in a seismic sensor having axis mechanics including a pivotable boom with a defined null point, the apparatus comprising:

boom spring tension adjustment means for positioning the boom at the null point; and actuator means for moving the adjustment assembly; wherein the actuator means includes a motor, an actuator screw, and coupling means for coupling the motor assembly to the actuator screw to rotate the actuator screw, such that the coupling means disengages upon the motor reversing and reengages upon the motor rotating a fixed amount.

18. The apparatus of claim 17, including means for reversing the motor a fixed amount to disengage the coupling means when the mass position adjustment apparatus is in a non-operational mode.

* * * * *